US012122022B2

(12) United States Patent
Jiries

(10) Patent No.: US 12,122,022 B2
(45) Date of Patent: Oct. 22, 2024

(54) TORQUE WRENCH WITH FORCE INDICATION

(71) Applicant: SMART WRENCH LTD, Haifa (IL)

(72) Inventor: Yousef Jiries, Haifa (IL)

(73) Assignee: SMART WRENCH LTD, Haifa (IL)

( * ) Notice: Subject to any disclaimer, the term of this patent is extended or adjusted under 35 U.S.C. 154(b) by 369 days.

(21) Appl. No.: 17/594,368

(22) PCT Filed: Apr. 7, 2020

(86) PCT No.: PCT/IL2020/050425
§ 371 (c)(1),
(2) Date: Oct. 13, 2021

(87) PCT Pub. No.: WO2020/212977
PCT Pub. Date: Oct. 22, 2020

(65) Prior Publication Data

US 2022/0193870 A1 Jun. 23, 2022

(30) Foreign Application Priority Data

Apr. 14, 2019 (IL) ........................................ 266010

(51) Int. Cl.
*B25B 23/142* (2006.01)
*B25G 1/10* (2006.01)

(52) U.S. Cl.
CPC ........ *B25B 23/142* (2013.01); *B25B 23/1425* (2013.01); *B25G 1/105* (2013.01)

(58) Field of Classification Search
CPC ....... B25B 13/28; B25B 13/462; B25B 23/14; B25B 23/142; B25B 23/1425;
(Continued)

(56) References Cited

U.S. PATENT DOCUMENTS

| | | |
|---|---|---|
| 5,557,994 A | 9/1996 | Nakayama |
| 6,389,636 B1 | 5/2002 | Savill |

(Continued)

FOREIGN PATENT DOCUMENTS

| | | |
|---|---|---|
| CL | 1998001750 A1 | 7/1999 |
| CN | 101468459 A | 7/2009 |

(Continued)

OTHER PUBLICATIONS

Albayrak et al, "Accuracy of torque-limiting devices: A comparative evaluation", The Journal of Prosthetic Dentistry, Aug. 2016, vol. 117, Issue 1, pp. 81-86, https://www.researchgate.net/publication/305818970.

(Continued)

*Primary Examiner* — Robert J Scruggs
(74) *Attorney, Agent, or Firm* — Vorys, Sater, Seymour, and Pease LLP; Anthony P. Venturino; Maryellen Feehery Hank

(57) ABSTRACT

Provided is a torque wrench, or Mechanical Torque Limiting Device (MTLD), that is configured to accurately indicate the torque applied thereby on the object (or vice versa). The measurement of the torque is carried out by incorporating a pressure sensitive material in a gripping portion that is associated with the body of the torque wrench. The pressure sensitive material is configured to exhibit a signal upon application of force thereof. The signal can be an electric-based, color-based, motion-based (vibrations) or audio-based indication.

12 Claims, 3 Drawing Sheets

(58) Field of Classification Search
CPC ..... B25B 23/1427; B25B 23/16; B25G 1/105; G01L 5/24
See application file for complete search history.

(56) References Cited

U.S. PATENT DOCUMENTS

| | | | | |
|---|---|---|---|---|
| 2002/0002752 | A1 | 1/2002 | Davies et al. | |
| 2002/0182564 | A1 | 12/2002 | Katsuda et al. | |
| 2005/0223857 | A1 | 10/2005 | Reynertson et al. | |
| 2008/0074643 | A1 | 3/2008 | Chen et al. | |
| 2010/0294094 | A1 | 11/2010 | Wilson et al. | |
| 2011/0132157 | A1 * | 6/2011 | Duvan | B25B 23/1425 81/479 |
| 2011/0239790 | A1 * | 10/2011 | Kuczynski | G01L 5/0052 73/862.624 |
| 2012/0101515 | A1 | 4/2012 | Barbod | |
| 2012/0229881 | A1 | 9/2012 | Hollman et al. | |
| 2013/0340188 | A1 | 12/2013 | Patel et al. | |
| 2014/0069202 | A1 | 3/2014 | Fisk | |
| 2016/0144492 | A1 | 5/2016 | Jiang | |
| 2016/0325413 | A1 | 11/2016 | Hsieh | |
| 2017/0225395 | A1 | 8/2017 | Boydston et al. | |
| 2017/0354403 | A1 * | 12/2017 | Liu | A61B 17/00234 |
| 2018/0117399 | A1 | 5/2018 | Meetin | |
| 2018/0280065 | A1 | 10/2018 | Babic et al. | |
| 2018/0304023 | A1 | 10/2018 | Tkebuchava et al. | |
| 2018/0306662 | A1 | 10/2018 | Burchett et al. | |
| 2019/0084135 | A1 * | 3/2019 | Guo | B25B 23/16 |

FOREIGN PATENT DOCUMENTS

| | | | |
|---|---|---|---|
| CN | 101468460 | A | 7/2009 |
| CN | 201852661 | U | 6/2011 |
| CN | 205465938 | * | 8/2016 |
| CN | 205465938 | U | 8/2016 |
| CN | 206357133 | * | 7/2017 |
| CN | 206357133 | U | 7/2017 |
| CN | 107014549 | A | 8/2017 |
| CN | 107255538 | A | 10/2017 |
| CN | 208913971 | U | 5/2019 |
| DE | 20-2004-006740 | U1 | 7/2004 |
| DE | 20 2006 017 235 | U1 | 1/2007 |
| DE | 10 2015 225 723 | A1 | 6/2017 |
| EP | 2 743 020 | A2 | 6/2014 |
| GB | 825282 | A | 12/1959 |
| KR | 20-0371988 | Y1 | 1/2005 |
| TW | 200930509 | A | 7/2009 |
| TW | 200930510 | A | 7/2009 |
| TW | M384744 | U | 7/2010 |
| TW | 201701840 | A | 1/2017 |
| WO | 89/05713 | A1 | 6/1989 |
| WO | 2012/118487 | A1 | 9/2012 |
| WO | 2017/025406 | A1 | 2/2017 |
| WO | 2017/025408 | A1 | 2/2017 |
| WO | 2018/115654 | A1 | 6/2018 |
| WO | 2018/115658 | A1 | 6/2018 |

OTHER PUBLICATIONS

Standlee et al., "Accuracy of an Electric Torque-Limiting Device for Implants", The International Journal of Oral & Maxillofacial Implants, 1999, vol. 14, No. 2, pp. 278-281.

* cited by examiner

TORQUE WRENCH WITH FORCE INDICATION

TECHNOLOGICAL FIELD

The present disclosure is in the field of hand-held tools, in particular tools for tightening objects, such as a Mechanical Torque Limiting Device (MTLD).

BACKGROUND ART

References considered to be relevant as background to the presently disclosed subject matter are listed below:

US 2008/074643
US 2017/354403
WO 17/025406
WO 17/025408
TW 201701840
US 2016/144492
US 2012/101515
WO 12/118487
US 2010/294094

Acknowledgement of the above references herein is not to be inferred as meaning that these are in any way relevant to the patentability of the presently disclosed subject matter.

BACKGROUND

There are many situations that require tightening of an object, such as screws and bolts, with an accurate torque value. A deviation from the exact torque value may have a great impact. For example, in the dental world, tightening an abutment to an implant too low may leave a gap, which increases the bacterial infiltration, increasing the possibility for infection, bone loss and implant failure. On the other hand, inserting the implant in higher torque than suggested by the manufacturer might induce stress on the bone and cause a bone resorption. In addition, it can cause a breakage of the screw that tightens the implant/abutment complex, causing a failure of the prosthetic rehabilitation. Since it is very difficult to obtain a direct measurement of the torque that is applied by a torque wrench, there are many different tools and methods that measures the torque indirectly. These tools have limited accuracy, which may be not sufficiently accurate for obtaining the desired medical result. Furthermore, these tools are typically required to be repeatedly calibrated. An accurate torque measurement will improve the results of many procedures that require high accuracy torque application.

GENERAL DESCRIPTION

The present disclosure concerns a torque wrench, or Mechanical Torque Limiting Device (MTLD), that is configured to accurately indicate the torque applied thereby on the object (or vice versa). Since the torque that is applied by a wrench head unit of the torque is mathematically related to the force applied by a user hand on the body of the torque wrench, i.e. the handle of the torque wrench, a measurement of the torque is carried out from a portion of the body that is manipulated by the user. When referring to manipulation of a user, it should be understood as any exertion of force/pressure, e.g. pressing, pulling, pushing, etc. This allows a simple and direct measurement of the torque, that does not require any force delivery mechanism that needs to be calibrated to provide an accurate torque measurement.

The measurement of the torque is carried out by incorporating a pressure sensitive material in a gripping portion that is associated with the body of the torque wrench. It should be understood that the gripping portion serves as a force application portion to which the user applies force when utilizing the torque wrench.

The pressure sensitive material is configured to exhibit a signal upon application of force thereof. The signal can be an electric-based, color-based, motion-based (vibrations) or audio-based indication. For example, the pressure sensitive material may be a piezochromic material that is configured to change its color upon application of a predetermined force thereon. It should be understood, that the reference to "a pressure sensitive material" is not limited to a single material and the term may refer to a combination of several pressure sensitive materials.

The reaction time between the application of sufficient force on the pressure sensitive material and the exhibition of the signal is immediate or almost immediate for real-time indicating the applied torque by the torque wrench.

Application of force to the gripping portion is converted into moment of force at the wrench head unit, dependent on the length of leverage, i.e. the distance between the wrench head unit and the gripping portion. When the force is thus applied over a piezochromic material, it results in a change of the color of the piezochromic material, which is indicative of a nominal torque value that is applied by the wrench head unit on an object.

It should be understood that any reference to a torque value that is applied by the wrench head unit, includes the torque value applied by the wrench head unit itself or by a tightening element that is coupled or screwed to the wrench head unit and engages the object to be tightened.

Thus, an aspect of the present disclosure provides a torque wrench. The torque wrench includes an elongated body extending between a proximal end and a distal end. A wrench head unit is disposed at the distal end of the elongated body.

At least one pressure sensing unit is associated with, or typically disposed at a portion of the elongated body of the torque wrench and is configured with at least one user interface gripping portion (hereinafter referred as gripping portion). Manipulation of the gripping portion can be by applying pressure thereto, pressing, pulling, pushing, etc. at least one gripping portion is configured for applying force to the pressure sensing unit by a user for utilizing the torque wrench. At least one of the gripping portions includes a pressure sensitive material that is configured to exhibit a signal upon application of a pressure thereon, the signal is being indicative of a torque applied to or by the wrench head unit. The pressure sensitive material is selected to be non-toxic for contact and compatible for hand-use by a user.

The pressure/torque applied by a user on the gripping portion and the elongated body of the torque wrench is proportional the torque that is applied to or by the wrench head unit. The value of the torque applied by the wrench head unit is proportionally related to the to the pressure/torque applied by a user on the gripping portion and the elongated body of the torque wrench according to the radius from the rotational axis.

In the case of several gripping portions, it is to be noted that each gripping portion is configured to exhibit one or more predetermined torque indication, therefore several gripping portions with different properties of pressure sensitive material provide several torque indication options for the user according to the desired torque to be applied by the torque wrench.

In some embodiments of the torque wrench, at least one of the gripping portions is sized to fit to the average index finger to be pressed thereon. For example, the size of the gripping portion may be one third of the thumb-facing side of an average index finger. In some embodiments of the torque wrench, the pressure sensitive material has a nominal threshold such that upon application of force thereon of the nominal threshold, the pressure sensitive material is configured to exhibit the signal. In other words, the signal is indicative of a nominal value of torque applied by the wrench head unit according to the properties of the pressure sensitive material. It is to be noted that the pressure sensitive material may be configured to exhibit different signals upon application of different nominal forces/pressures thereon. For example, upon application of a force thereon of a first value, a first signal is exhibited, upon application of a force of a second value, a second signal is exhibited and so on.

In some embodiments, the torque wrench is a medical torque wrench. The torque wrench may be an orthopedic torque wrench or a dental torque wrench that is configured for tightening abutments to dental implants and for exhibiting a signal upon reaching a desired and accurate tightening torque of the implant and abutments. It is to be noted that the terms tightening and fastening in their various forms may be interchangeably used throughout the application. In the case of dental implants, an accurate tightening torque is of a great importance, where a lower torque may result in an implant that is not well seated and cause penetration of bacteria into the implant/abutment gap, and higher torque may impose high pressure on the bone that may damage it. In addition, when it is applied on a screw, it may cause screw breakage and failure of the prosthetic rehabilitation.

In some embodiments of the torque wrench, the pressure sensing unit is detachably attachable with the elongated body. In other words, the pressure sensing unit is configured to be coupled with the elongated body and also to be detached therefrom. This configuration permits replacing the pressure sensing unit, whether a new identical unit is replaced with an old, used one, or a different pressure sensing unit with a different nominal value pressure indication is replaced with the current one. The different pressure sensing unit is configured to exhibit signal upon application of a different range or nominal pressure values thereon that is indicative of the torque applied by the wrench head unit.

In some other embodiments of the torque wrench, the pressure sensing unit is integral with the elongated body. The pressure sensing unit may be formed within a portion of the elongated body. For example, the pressure sensing unit may be formed as or in a depression of the elongated body.

Furthermore, since there may be differences in the requirements of sterilization means for the pressure sensing unit and the other parts of the torque wrench, the detachment of the pressure sensing unit from the elongated body permits a separate sterilization of the pressure sensing unit and the other parts, e.g. in an autoclave, between uses of the torque wrench. For example, some parts of a medical torque wrench require sterilization with high temperatures and pressure which can affect the functionality of the pressure sensing unit, thus it is required to detach it before such sterilization.

In some embodiments of the torque wrench, the pressure sensitive material is configured for reversible indication, namely configured to exhibit a signal upon exceeding or attaining the target force/pressure threshold and return to its initial, non-signal exhibiting state upon reduction of the force/pressure applied thereon below the target threshold.

In some embodiments of the torque wrench, the pressure sensitive material is configured to change its color upon application of a certain force/pressure thereon. The pressure sensitive material may be configured to exhibit one color change upon attaining a certain threshold of applied force thereon and upon removal of the applied force, the pressure sensitive material returns to its original color. In some embodiments, the pressure sensitive material is configured to exhibit several colors, the color that is exhibited depends of the amount of applied force on the pressure sensitive material. For example, upon attaining a first force threshold, a first color is exhibited, upon attaining a second force threshold, a second color is exhibited, etc.

In some embodiments of the torque wrench, the pressure sensitive material is configured to exhibit visual signal. In some embodiments, the pressure sensitive material is configured to generate an electric current, where such electric current can be converted into an audio, touch sense, such as vibration, and/or a visible signal. It is to be noted, that in some embodiments, the pressure sensing unit may include a combination of pressure sensitive materials configured together to exhibit visual signal and produce electric current. In order for the user to identify the electric current produced by the pressure sensitive material, a current reading unit, e.g. ammeter, that is capable of measuring electric current and outputting a read thereof is electrically coupled to the pressure sensitive material. The reading of the current can be transmitted to a display to be displayed such that the user may monitor the output value, which is indicative of the pressure applied on the pressure sensitive material. By using a pressure sensitive material that is configured to produce electric current in proportion to the pressure applied thereon, the torque value can be monitored continuously and the user may gradually increase the torque until reaching the desired value. In other embodiments, the electricity-producing pressure sensitive material may be electrically coupled to an electrical-sensitive unit that is configured to exhibit signals upon receiving an electric current above a certain threshold. The electrical-sensitive unit may be configured to exhibit different signals upon receiving an electric current above predetermined different thresholds. For example, upon reaching a current of a first value, the electrical-sensitive unit exhibits a first signal, upon reaching a current of a second value exhibits a second value and so on.

In some embodiments of the torque wrench, the pressure sensitive material is configured to produce sound upon application of a predetermined threshold thereon. For example, the pressure sensitive material can be a single use material having a popping or rupturing mechanism that upon application of force of a certain threshold thereon is popped or ruptured and produces a sound. It is to be noted that this mechanism may be also visible such that the user may observe the rupturing or the popping once it occurs. In other embodiments, the sound-producing pressure sensitive material may be reused several times. The sound-producing pressure sensitive material may have a cocking mechanism that is being cocked after each use and once actuated by a certain pressure that is applied thereon, it produces a sound.

In some embodiments of the torque wrench, the pressure sensitive material is applied to the gripping portion such that the signal emitted thereby is identifiable upon applying torque to the wrench head unit, namely when a finger applies a pressure thereon. For example, in the instance the pressure sensitive material is piezochromic, the visual signal thereof indicating that a certain pressure is applied thereon is visible from several sides. The pressure sensitive material may be exposed for gripping, through the gripping portion, from a first side panel and at least a portion thereof is visible through a second side panel such that the visual signal produced thereby is visible through the second panel, such that the gripping is not visually obstructed by fingers of the individual manipulating the device. In some embodiments, the gripping portion and the pressure sensitive material therein are sized and/or shaped so as to ensure that the exhibited signal is identifiable while pressure is applied on at least a portion thereof by the user.

In some embodiments, the signal exhibited by the pressure sensitive material is remoted from the location of the pressure sensitive material to be easily visible by the user.

In some embodiments of the torque wrench, the pressure sensing unit is disposed at or at the vicinity of the proximal end. In some embodiments, the pressure sensing unit is disposed at a third proximal end. In other words, the pressure sensing unit is typically disposed at the portion of an end of the elongated body that is opposite to the end that is coupled to the head wrench unit. This configuration allows a user to apply a relatively low force on the gripping portion that results in a relatively large torque at the rotational axis, namely the head wrench unit.

In some embodiments of the torque wrench, the elongated body comprises a plurality of coupling locations and the pressure sensing unit is configured to be coupled with any of such coupling location. Each coupling location is disposed at a different distance from the wrench head unit, therefore, by coupling the pressure sensing unit at different coupling locations, the signal that is exhibited by the pressure sensitive material is indicative of a different torque. Namely, in the instance the pressure sensitive material is configured to exhibit a non-tunable signal that is indicative of a certain pressure that is applied thereon, the pressure sensing unit may be tunable along a plurality of coupling locations on the elongated body such that the signal is indicative in each coupling location of different torque (according to the radius from the rotational axis).

In some embodiments of the torque wrench, the gripping portion includes a plurality of gripping locations. A different pressure sensitive material may be associated with each gripping point, each pressure sensitive material is configured to exhibit signal upon application of different pressure thereon. In some other embodiments, at least two of the gripping locations are associated with a common pressure sensitive material, however since each gripping point is disposed at different distance from the rotational axis (i.e. having a different torque depending on the length of the lever) the signal that is exhibited by the pressure sensitive material while applying pressure thereon through each gripping point is indicative of a different torque.

The gripping locations and/or the coupling locations may include corresponding markings indicative of a nominal torque such that the user may adjust the torque wrench to exhibit signal for a range of desired torques.

In some embodiments, the pressure sensitive material is selected from a group consisting of piezochromic material, piezoelectric material, single use rupturable material (e.g. that produces a rupturing sound above a certain threshold) or any combinations thereof.

The pressure sensitive material should be selected so it is not affected by high temperature, saliva, alcohol, chemical liquid and water. In case the pressure sensitive is affected by one of the above conditions, it is isolated from the environment in the gripping portion, e.g. by a water-proof sealing so it is remained uncontaminated.

In some embodiments, the pressure sensitive material is thin sticker, or cubic that fits in the gripping portion.

In some embodiments, the torque wrench includes an alerting unit configured to identify the signal exhibited by the pressure sensitive material and generate an alert signal indicative of a nominal torque, or at some embodiments the alert signal may be indicative of a predetermined, pre-set, nominal torque. In the instance that the pressure sensitive material is piezochromic, the alerting unit may be configured to identify a change of color. In the instance that the pressure sensitive material is piezoelectric, the alerting unit may be configured to identify and/or measure the change of electric current produced thereby. The alert signal may be an audio signal, an amplified visual alert that is displayed on a display, a transmission of data signal to an external device such as a mobile device, etc.

In some embodiments of the torque wrench, the alerting unit is configured to vibrate in response to the received signal. For example, if the received signal is electric-based signal then the alerting unit may include a vibration unit that receives the voltage difference to trigger it to vibrate.

In some embodiments, the pressure sensitive material comprises a combination of piezoelectric and piezochromic materials. This combination yields a dual signal that produce voltage difference, i.e. electricity that typically transforms to audible signal noticeable by the user, and a color-change indication upon application of a certain force thereon. This may yield an increased credibility of the measured forces that is translated to the real applied torque by the torque wrench.

Another aspect of the present disclosure provides a pressure sensing unit. The pressure sensing unit includes a coupling arrangement configured for association/coupling with a body of a torque wrench. The pressure sensing unit further includes at least one user interface gripping portion, each of the gripping portions includes a pressure sensitive material configured to exhibit a signal upon application of a pressure thereon. In other words, a pressure sensitive material is disposed at the gripping portions such that upon gripping of the gripping portion by a user, the pressure sensitive material is manipulated and pressure is applied thereon. Therefore, the pressure sensing unit is configured such that upon coupling with a body of a torque wrench, the user may utilize the torque wrench by gripping the gripping portion.

In some embodiments of the pressure sensing unit, the pressure sensitive material is configured to exhibit visual signal.

In some embodiments of the pressure sensing unit, the gripping portion comprises a plurality of gripping locations. Each of the gripping locations is indicative of a predetermined torque value that is applied by the wrench head unit when gripping from the corresponding gripping point.

In some embodiments of the pressure sensing unit, each gripping point comprises a corresponding marking that indicates the torque that is applied by a wrench head unit of the torque wrench upon using the torque wrench by gripping the corresponding gripping point.

In some embodiments of the pressure sensing unit, the pressure sensitive material is selected from a group consisting of piezochromic material, piezoelectric material or combination thereof.

Another aspect of the present disclosure provides a kit that includes (i) a torque wrench that comprises an elongated body, (ii) a wrench head unit and (iii) at least one pressure sensing unit as described above with respect to an aspect of the present disclosure.

Another aspect of the present disclosure provides a kit that includes (i) an elongated body of a wrench torque that is configured for coupling with a wrench head unit and (ii) at least one pressure sensing as described above with respect to an aspect of the present disclosure.

In some embodiments, the kit includes a wrench head unit detachably attachable to the elongated body.

In some embodiments of the kit, the elongated body comprises a plurality of coupling locations. Each coupling location is disposed at a different portion of the elongated body, each of the different portions corresponds to a different distance from the head wrench unit and is indicative of a different torque applied thereby.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which:

FIG. 1A is a bottom view; and FIG. 1B is a side view of the torque wrench.

DETAILED DESCRIPTION OF EMBODIMENTS

The following figures are provided to exemplify embodiments and realization of the invention of the present disclosure.

Figure 1A:
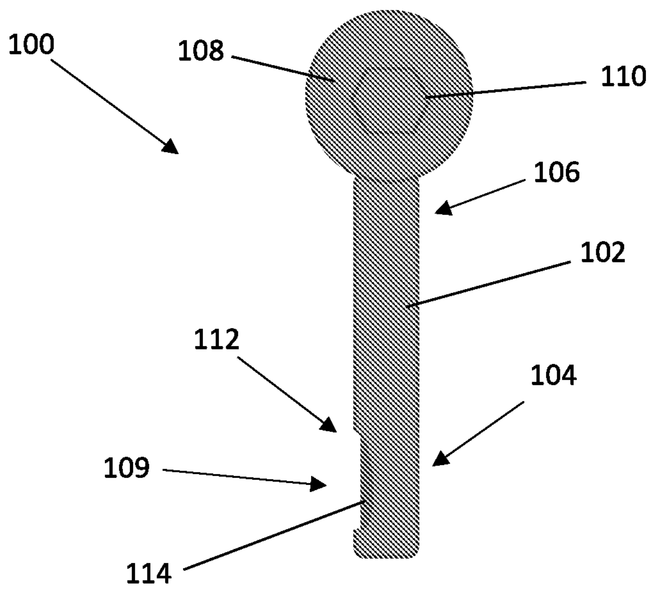
FIGS. 1A-1B are schematic illustrations of non-limiting example of an embodiment of a torque wrench according to the present disclosure.
Figure 1B:
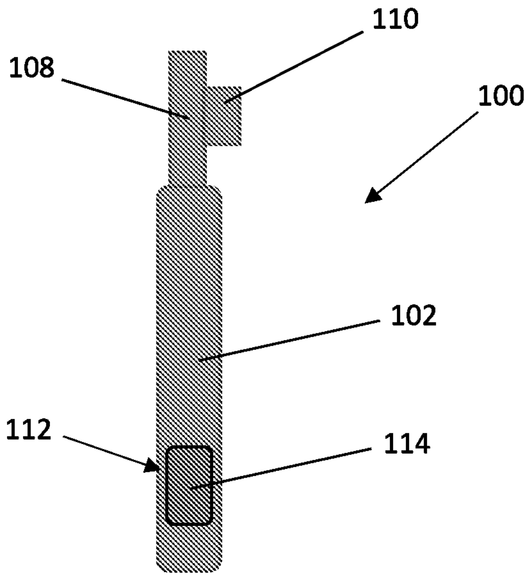

Reference is first made to FIGS. 1A-1B, which is are schematic illustrations of an embodiment of a torque wrench according to the present disclosure, wherein FIG. 1A is bottom view and FIG. 1B is a side view. The torque wrench 100 includes an elongated body 102, extending between a proximal end 104 and a distal end 106. A wrench head unit 108 is coupled to the distal end 106 of the elongated body 102 such that the wrench head unit 108 and the elongated body 102 constitute the torque wrench 100. The wrench head unit 108 may be integral with the elongated body 102 or detachably coupled therewith. The wrench head unit 108 includes a fastening portion 110 that is configured to be coupled with a screwing element (not shown) that is configured to engage with an object to be fastened, and fasten it upon application of torque thereon. In some embodiments, the fastening portion 110 is configured to engage with an object (not shown) to be fastened directly, and fasten it upon application of torque thereon.

The elongated body 102 includes a pressure sensing unit 109 that is configured with a gripping portion 112. The gripping portion 112 is configured to be gripped by a user utilizing the torque wrench 100. In this specific non-limiting example, the gripping portion comprises a groove or depression that is configured for accommodating one or more fingers of a user, e.g. a pointing finger, upon utilizing the torque wrench 100. The gripping portion 112 is formed at the proximal end 104 half portion of the elongated body 102 and includes a pressure sensitive material 114, e.g. a piezochromic, piezoelectric material, a sound-producing material or any combination thereof, that is configured to exhibit a signal upon application of pressure thereon. The pressure sensitive material 114 is formed within the depression such that a user utilizing the torque wrench 100 by gripping the gripping portion 112 exerts pressure on the pressure on the pressure sensitive material 114 that is indicative of the torque applied by the wrench head unit 108. The pressure sensitive material 114 is configured to exhibit signal that is indicative of the torque applied by the wrench head unit 108 such that the user may monitor the application of torque to accurately fasten the object to the desired torque value.

In the figures throughout the application, like elements of different figures were given similar reference numerals shifted by the number of hundreds corresponding to the number of the figures. For example, element 202 in FIG. 2 the same function as element 102 in FIGS. 1A-1B.

Figure 2:
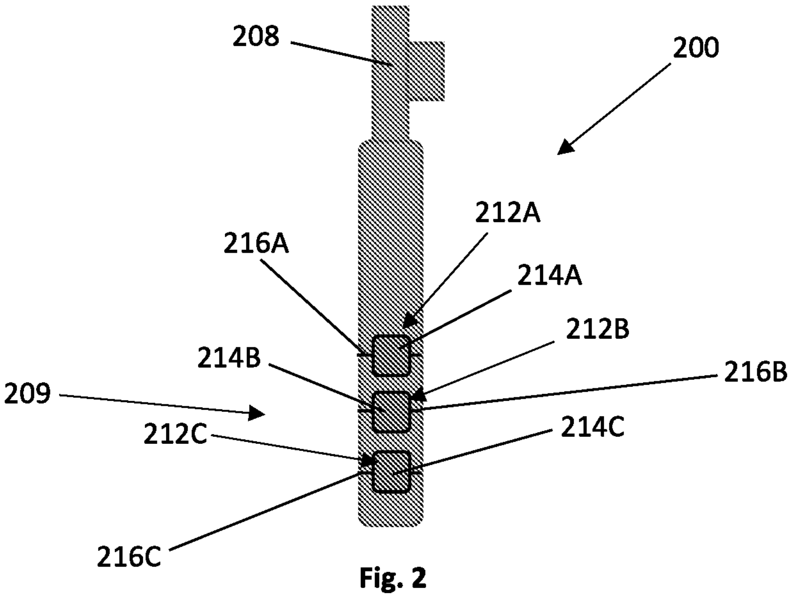
FIG. 2 is a side view of schematic illustration of non-limiting example of the torque wrench of the present disclosure having a plurality of gripping portions.

FIG. 2 is a side view of schematic illustration of non-limiting example of the torque wrench of the present disclosure having a plurality of gripping portions. In this exemplary embodiment, the pressure sensing unit 209 of the torque wrench 200 includes three gripping portions 212A, 212B and 212C, each having its own pressure sensitive material 214A, 214B and 214C. Each of the pressure sensitive materials may have different properties or they can be similar such that they exhibit the same signal upon application of similar force thereon. For example, in the pressure sensitive materials may be piezochromic and configured to exhibit a color change upon application of similar force thereon. Therefore, by using the torque wrench from each of the gripping portions, the color change indicates a different torque that is applied by the wrench head unit 208. Markings 216A, 216B and 216C mark the location for gripping the gripping portion and each indicates the nominal torque value that is applied by the wrench head unit 208 upon color changing of the corresponding pressure sensitive material. In other words, the torque value that is indicated by a signal that is exhibited by the pressure sensitive material, is determined by the combination of the properties of the pressure sensitive material and the location thereof along the elongated body.

Figure 3:
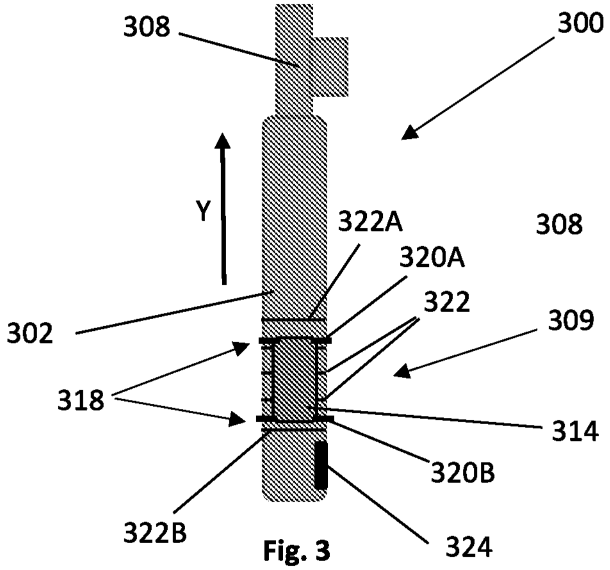
FIG. 3 is a side view of a schematic illustration of a non-limiting example of a torque wrench coupled with a detachable pressure sensitive unit according to an embodiment of the present disclosure.

FIG. 3 is a side view of a schematic illustration of a non-limiting example of a torque wrench coupled with a detachable pressure sensitive unit according to an embodiment of the present disclosure. The pressure sensing unit 309 comprises a coupling arrangement 318 that is configured with arms 320A and 320B for tight association with the elongated body 302 of the torque wrench 300. The arms 320 may be configured for sliding engagement with the elongated body 302 such that the pressure sensing unit 309 is configured to slide along the elongated body between a plurality of coupling locations 322. By sliding the pressure sensing unit 309 the exhibited signal may be tuned for the desired torque. By sliding the pressure sensing unit 309 in the direction of arrow Y, the pressure sensing unit 309 is tuned to exhibit signal that is indicative of a lower torque value that is applied by the wrench head unit 308. For example, the signal exhibited by a piezochromic material upon coupling the pressure sensing unit 309 to a coupling location 322A, is indicative of a lower torque than if the pressure sensing unit 309 is coupled to a coupling location 322B.

The torque wrench 300 includes an alerting unit 324 that is configured to detect the signal that is exhibited by the pressure sensitive material 314 and to provide an alert upon detection of the signal. In some embodiments, the alerting unit 324 is configured to transmit the signal to an external device (not shown) such as monitor or mobile device for displaying the torque value that is currently applied by the wrench head unit 308.

The alerting unit 324 may include one or more sensors, such as optical or electrical sensitive sensors for that are configured to sense the signal and generate signal data indicative thereof. The alerting unit 324 receives the signal data and provide an output based thereon.

For example, the pressure sensitive material 314 may be a piezoelectric material that is electrically coupled to the alerting unit 324. The alerting unit 324 can exhibit a signal, e.g. by displaying a color or outputting a sound alert, according to the amount of pressure that is applied on the piezoelectric material. The alerting unit 324 may exhibit one or more signals upon detecting an electric current that corresponds to a certain predetermined torque value. For example, upon detecting a current value that corresponds to a first torque value, the alerting unit 324 exhibits a first signal, upon detecting a current value that corresponds to a second torque value, the alerting unit 324 exhibits a second signal and so on. It is to be noted that the alerting unit 324 may be pre-set, namely calibrated, according to the specific coupling location of the pressure sensing unit 309. That ensures that the its translation of the current reading to the torque value is accurate.

In another example, the pressure sensitive material 314 may be a combination of piezochromic and piezoelectric material. The pressure sensitive material is configured for (i) change its color and (ii) produce electricity to an alerting unit sufficient for producing an alerting signal upon application of a certain force/pressure thereon, typically the alerting signal is by sound noticeable to the user.

Figure 4:
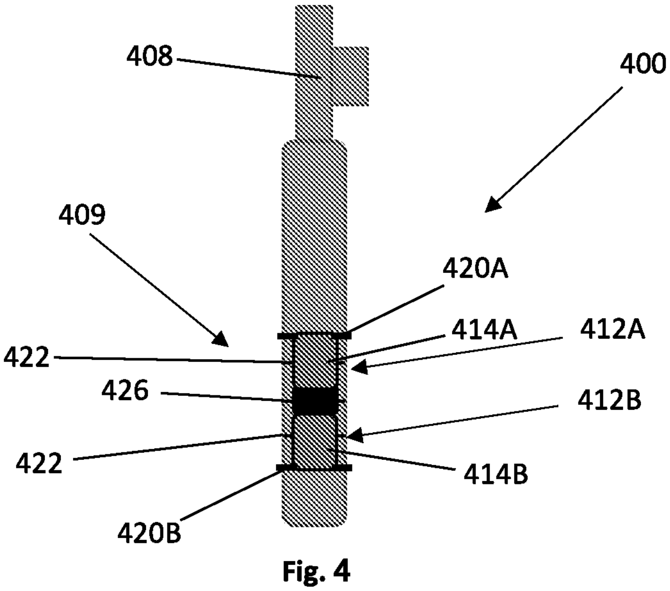
FIG. 4 is a side view of a schematic illustration of a non-limiting example of a torque wrench coupled with a detachable pressure sensitive unit having two gripping portions, according to an embodiment of the present disclosure.

FIG. 4 is a side view of a schematic illustration of a non-limiting example of a torque wrench coupled with a detachable pressure sensitive unit having two gripping portions, according to an embodiment of the present disclosure. The torque wrench 400 is coupled to the pressure sensing unit 409 in a detachable manner. The pressure sensing unit 409 is tunable between a plurality of coupling locations 422 and is configured with two gripping portions 412A and 412B, separated by a spacer 426. The pressure sensitive materials 414A and 414B may have similar or different properties to exhibit similar or different signal, respectively, upon application of similar pressure thereon.

The invention claimed is:

1. A torque wrench comprising:

an elongated handle body extending between a proximal end and a distal end;

a wrench head unit disposed at the distal end;

at least one pressure sensing unit associated with the elongated body and configured with at least one user interface gripping portion, each of the gripping portions comprises a pressure sensitive material configured to exhibit a signal upon application of a certain pressure thereon, wherein said signal is indicative of torque applied to the wrench head unit;

wherein said pressure sensitive material is piezochromic material.

2. The torque wrench of claim 1, wherein the signal is indicative of a nominal value of torque applied by the wrench head unit.

3. The torque wrench of claim 1, wherein the pressure sensing unit is detachably attachable with the elongated body.

4. The torque wrench of claim 1, wherein the pressure sensing unit is integral with the elongated body.

5. The torque wrench of claim 1, wherein the pressure sensitive material is configured to exhibit visual signal.

6. The torque wrench of claim 1, wherein the pressure sensitive material is configured to produce electric current, or to produce sound upon application of a predetermined threshold thereon.

7. The torque wrench of claim 1, wherein the pressure sensing unit is configured to be coupled to a plurality of coupling locations on the elongated body, each coupling location is at a different distance from the wrench head unit.

8. The torque wrench of claim 1, wherein the gripping portion comprises a plurality of gripping locations, each is indicative of a predetermined torque value that is applied by the wrench head unit when gripping from the corresponding gripping point.

9. The torque wrench of claim 8, wherein each gripping point comprises a corresponding marking indicative of a nominal torque.

10. The torque wrench of claim 1, comprising an alerting unit configured to identify said signal and generate an alert signal indicative of a nominal torque.

11. The torque wrench of claim 1, wherein the pressure sensitive material comprises a piezochromic material and a piezoelectric material such that the signal is a dual signal formed of electric-based signal and visual signal.

12. The torque wrench of claim 1 being a medical torque wrench.

* * * * *